United States Patent
Genova et al.

(10) Patent No.: US 8,619,094 B2
(45) Date of Patent: Dec. 31, 2013

(54) MORPHOLOGICAL ANTI-ALIASING (MLAA) OF A RE-PROJECTION OF A TWO-DIMENSIONAL IMAGE

(75) Inventors: Barry M Genova, Kenmore, WA (US); Tobias Berghoff, Cambridge (GB)

(73) Assignee: Sony Computer Entertainment America LLC, San Mateo, CA (US)

( * ) Notice: Subject to any disclaimer, the term of this patent is extended or adjusted under 35 U.S.C. 154(b) by 404 days.

(21) Appl. No.: 12/986,854

(22) Filed: Jan. 7, 2011

(65) Prior Publication Data

US 2012/0176367 A1  Jul. 12, 2012

(51) Int. Cl.
G09G 5/00 (2006.01)

(52) U.S. Cl.
USPC ........... 345/611; 345/606; 345/612; 345/629; 345/634; 345/639; 345/1.1; 345/9; 382/267; 382/268; 382/294

(58) Field of Classification Search
None
See application file for complete search history.

(56) References Cited

U.S. PATENT DOCUMENTS

| | | | |
|---|---|---|---|
| 6,031,538 A | 2/2000 | Chupeau et al. | |
| 8,106,924 B2 * | 1/2012 | Aliprandi et al. | 345/629 |
| 8,289,346 B2 * | 10/2012 | Priede et al. | 345/629 |
| 8,514,225 B2 | 8/2013 | Genova | |
| 2001/0053247 A1 | 12/2001 | Sowinski | |
| 2002/0080143 A1 | 6/2002 | Morgan | |
| 2005/0089212 A1 | 4/2005 | Mashitani et al. | |
| 2005/0226538 A1 | 10/2005 | Di Federico et al. | |
| 2006/0088206 A1 | 4/2006 | Era | |
| 2006/0232584 A1 | 10/2006 | Utsugi et al. | |
| 2007/0146360 A1 | 6/2007 | Clatworthy et al. | |
| 2008/0043096 A1 | 2/2008 | Vetro et al. | |
| 2008/0174659 A1 | 7/2008 | McDowall | |
| 2009/0147074 A1 | 6/2009 | Getty | |
| 2009/0168187 A1 | 7/2009 | Woodgate et al. | |
| 2009/0244268 A1 | 10/2009 | Masuda et al. | |
| 2009/0315996 A1 | 12/2009 | Guler et al. | |
| 2010/0073368 A1 | 3/2010 | Kim et al. | |
| 2010/0142924 A1 | 6/2010 | Yamashita et al. | |
| 2010/0215251 A1 | 8/2010 | Gunnewiek et al. | |
| 2010/0238164 A1 * | 9/2010 | Steedly et al. | 345/419 |
| 2010/0295853 A1 | 11/2010 | Diamand | |
| 2010/0315412 A1 | 12/2010 | Sinha et al. | |

FOREIGN PATENT DOCUMENTS

WO  2009027691 A1  3/2009

OTHER PUBLICATIONS

Reshetov, Alexander Intel Labs. "Morphological antialiasing." 'Proceedings of the Conference on High Performance Graphics 2009. pp. 109-116. ACM New York, NY, USA © 2009.*

PCT International Search Report mailed date Apr. 4, 2012 for PCT Application No. PCT/US11/63003.

(Continued)

*Primary Examiner* — Antonio A Caschera (74) *Attorney, Agent, or Firm* — Joshua D. Isenberg; JDI Patent (57) ABSTRACT

Morphological anti-aliasing (MLAA) of a re-projection of a two-dimensional image can be implemented in a way that produces a better result while using fewer processor resources. One or more discontinuities between each neighboring pixel of the two-dimensional image are determined. One or more pre-defined patterns formed by the one or more discontinuities are identified. A blend amount is calculated for each pixel neighboring the identified pre-defined patterns. A re-projection is applied to the two-dimensional image and to the blend amount for each pixel thereby generating re-projected blend amounts. The neighboring pixels of the re-projection are then blended according to the re-projected blend amounts.

24 Claims, 4 Drawing Sheets

(56) References Cited

OTHER PUBLICATIONS

Christopher Fehn, "A 3D-TV Approach Using Depth-Image-Based Rendering (DIBR)", Proceedings of Visulization, Imaging, and Image Processing (VIIP), Sep. 8-10, 2003, track 396-084.

Voicu Popescu, "Foward Rasterization: A Reconstruction Algorithm for Image-Based Rendering", Doctoral Thesis, Department of Department of Computer Science University of North Carolina, Chapel Hill, May 2001.

Voicu Popescu et al. "High Quality 3D Image Warping by Separating Visibility from REconstruction", 1999.

Final Office Action of May 3, 2013 for U.S. Appl. No. 12/986,872, filed Jan. 7, 2011.

Office Action of Apr. 4, 2013 for U.S. Appl. No. 12/986,814, filed Jan. 7, 2011.

Office Action of Nov. 8, 2012 for U.S. Appl. No. 12/986,872, filed Jan. 7, 2011.

Office Action of Oct. 26, 2012 for U.S. Appl. No. 12/986,827, filed Jan. 7, 2011.

Notice of Allowance of May 10, 2013 for U.S. Appl. No. 121986,827, filed Jan. 7, 2011.

Final Office Action dated Aug. 8, 2013 for U.S. Appl. No. 12/986,814, filed Jan. 7, 2011.

Non-final Office Action dated Sep. 30, 2013 for U.S. Appl. No. 12/986,872, filed Jan. 7, 2011.

\* cited by examiner

MORPHOLOGICAL ANTI-ALIASING (MLAA) OF A RE-PROJECTION OF A TWO-DIMENSIONAL IMAGE

CROSS REFERENCE TO RELATED APPLICATIONS

This application is related to commonly-assigned co-pending application Ser. No. 12/986,814, entitled "DYNAMIC ADJUSTMENT OF PREDETERMINED THREE-DIMENSIONAL RE-PROJECTION SETTINGS BASED ON SCENE CONTENT", filed the same date as the present application.

This application is related to commonly-assigned co-pending application Ser. No. 12/986,827, entitled "SCALING PIXEL DEPTH VALUES OF USER-CONTROLLED VIRTUAL OBJECT IN THREE-DIMENSIONAL SCENE", filed the same date as the present application.

This application is related to commonly-assigned co-pending application Ser. No. 12/986,872, entitled "MULTI-SAMPLE RESOLVING OF RE-PROJECTION OF TWO-DIMENSIONAL IMAGE", filed the same date as the present application.

BACKGROUND OF INVENTION

The ability to perceive two-dimensional images in three-dimensions by way of numerous different technologies has grown quite popular over the past few years. Providing an aspect of depth to two-dimensional images potentially creates a greater sense of realism to any depicted scene. This introduction of three-dimensional visual representation has greatly enhanced viewer experiences, especially in the realm of video games.

A number of techniques exist for the three-dimensional rendering of a given image. Most recently, a technique for projecting a two-dimensional image(s) into three-dimensional space known as depth-image-based rendering (DIBR) has been proposed. In contrast to former proposals, which often relied on the basic concept of "stereoscopic" video, i.e., the capturing, transmission, and display of two separate video streams—one for the left eye and one for the right eye-, this new idea is based on a more flexible joint transmission of monoscopic video (i.e., single video stream) and associated per-pixel depth information. From this data representation, one or more "virtual" views of the 3-D scene can then be generated in real-time at the receiver side by means of so-called DIBR techniques. This new approach to three-dimensional image rendering presents several advantages over previous approaches.

There are generally two ways to present two separate images to a viewer to create the illusion of depth. In a system commonly used for projection of 3D images onto a screen there are two separate synchronized projectors for the left-eye and right-eye images. The images for both eyes are projected onto a screen simultaneously but with orthogonal polarizations, e.g., vertical polarization for the left-eye image and horizontal polarization for the right eye image. The viewer wears a special pair of polarized 3D-viewing glasses having appropriately polarized lenses for the left and right eyes (e.g., vertically polarized for the left eye and horizontally polarized for the right eye). Because of the polarization of the images and the lenses, the viewer perceives only the left eye image with the left eye and only the right eye image with the right eye. The degree of the illusion of depth is partly a function of the offset between the two images on the screen.

In 3D video systems, the left-eye and right eye images are displayed by a video display screen but not exactly simultaneously. Instead, the left-eye and right-eye images are displayed in an alternating fashion. The viewer wears a pair of active shutter glasses that shutter the left eye when the right-eye image is displayed and vice versa.

The experience of 3-D video can depend somewhat on the peculiarities of human vision. For example, the human eye has a discrete number of light receptors, yet humans do not discern any pixels, even in peripheral vision. What is even more amazing is that the number of color-sensitive cones in the human retina can differ dramatically among individuals—by up to a factor of 40. In spite of this, people appear to perceive colors the same way—we essentially see with our brains. The human vision system also has an ability to ascertain alignment of objects at a fraction of a cone width (hyperacuity). This explains why spatial aliasing artifacts (i.e., visual irregularities) are more noticeable than color errors.

Realizing this fact, graphics hardware vendors put significant efforts in compensating for aliasing artifacts by trading color accuracy for spatial continuity. Multiple techniques are supported in hardware, based on mixing weighted color samples, similar to the integrating property of digital cameras.

Of course, any aliasing artifact will eventually disappear with an increase in display resolution and sampling rates. It can also be handled at lower resolutions, by computing and averaging multiple samples per pixel. Still, for most image-rendering algorithms (e.g., ray tracing, rasterization-based rendering) this might not be very practical, dramatically decreasing overall performance by computing color samples that are eventually discarded through averaging.

Morphological anti-aliasing (MLAA) is a technique based on the recognition of certain patterns within an image. Once these patterns are found, colors may be blended around these patterns, aiming at achieving the most probable a posteriori estimation of a given image. MLAA has a set of unique characteristics distinguishing it from other anti-aliasing algorithms. MLAA is completely independent from the rendering pipeline. It represents a single post-processing kernel, which can be implemented on the GPU even if the main algorithm runs on the CPU. MLAA, even in an un-optimized implementation, is reasonably fast, processing about 20M pixels per second on a single 3 GHz core.

MLAA is an established anti-aliasing technique for two-dimensional images. However, performing the same MLAA technique used for two-dimensional images on a three-dimensional re-projection presents additional problems that must be addressed.

It is within this context that embodiments of the present invention arise.

DESCRIPTION OF SPECIFIC EMBODIMENTS

Introduction

Aliasing refers to the production of visual distortion artifacts (i.e., jagged edges between neighboring pixels) caused by representing a high resolution image at a lower resolution. Morphological anti-aliasing is the process of blending those jagged edges that occur between pixel discontinuities in a given image to produce a smoother looking resulting image for the viewer. Usually, the morphological anti-aliasing process for two-dimensional images occurs in three stages: 1) finding the discontinuities between pixels in a given image, 2) identifying pre-defined patterns created by those discontinuities, and 3) blending colors in the neighborhood of those pre-defined patterns to create a smoother image.

However, morphological anti-aliasing for a re-projection of a two-dimensional image creates an additional set of problems not present during anti-aliasing of a two-dimensional image. For a 2-dimensional image to be re-projected into three-dimensions, two separate video images (one for each eye) must be presented to the viewer such that their arrangement creates the illusion of depth. This added dimension of depth makes applying the technique used for two-dimensional morphological anti-aliasing difficult.

A first possible solution for implementing morphological anti-aliasing in three-dimensions involves running morphological anti-aliasing on each two-dimensional image after it is re-projected into each viewpoint. Thus, determination of pixel discontinuities and blending would be done twice for each two-dimensional image to be re-projected in three-dimensions, in the case of re-projecting to a left and right eye. While in theory, this solution may provide an accurate procedure for morphological anti-aliasing of a three-dimensional re-projection, in reality, it is very expensive to implement. Moreover, running morphological anti-aliasing more than once for each two-dimensional image to be re-projected in three-dimensions would significantly lower performance of some 3D video applications (e.g., for a video game or video game system processor). Additionally different edges may be detected across the different images, so one eye may see a blended edge while the other eye still sees an aliased edge. This is a form of retinal rivalry, reducing the believability of the overall stereoscopic effect and adding certain uncomfotableness to the perceived 3D image.

A second solution for implementing morphological anti-aliasing in three-dimensions involves running morphological anti-aliasing once on each two-dimensional image before three-dimensional re-projection. While this does provide a cost-effective solution, it also adds haloing artifacts to the three-dimensional re-projection. Blending prior to re-projection may lead to foreground pixels being blended with background pixels. During re-projection a foreground pixel will shift a different amount than a background pixel. Occasionally this will leave a hole between these pixels. Haloing artifacts refer to the color or geometry information of an element in the scene appearing on the other side of the hole. Assigning depth values to blended two-dimensional image pixels during morphological anti-aliasing is difficult as no single value can represent both sides of the hole. A single value may split the hole into two holes reducing the hole size but not actually solving the issue. Because a sufficient method for determining pixel depth values of blended two-dimensional images does not exist, these haloing artifacts become a recurring problem when morphological anti-aliasing is done prior to three-dimensional re-projection.

Embodiments of the present invention utilize a different approach. Instead of blending prior to re-projection, the blend amounts are calculated before re-projection but the blend is not applied to the pixels before re-projection. Instead, the re-projection is applied to the calculated blend amounts to produce re-projected blend amounts. After re-projection, these re-projected blend amounts are applied to the relevant pixels in the re-projected image. Specifically, discontinuities can be determined between each neighboring pixel of a two-dimensional image. Pre-defined patterns formed by the one or more discontinuities can be identified and a blend amount can be calculated for each pixel neighboring the pre-defined patterns. A three-dimensional re-projection can then be applied to the two-dimensional image and its corresponding blend amounts. The resulting re-projected blend amounts can then be applied to the neighboring pixels of the three-dimensional re-projection. This technique is advantageous in that it is less computationally intensive than either of the foregoing solutions and produces better results than a more rigorous approach.

Embodiments

Figure 1:
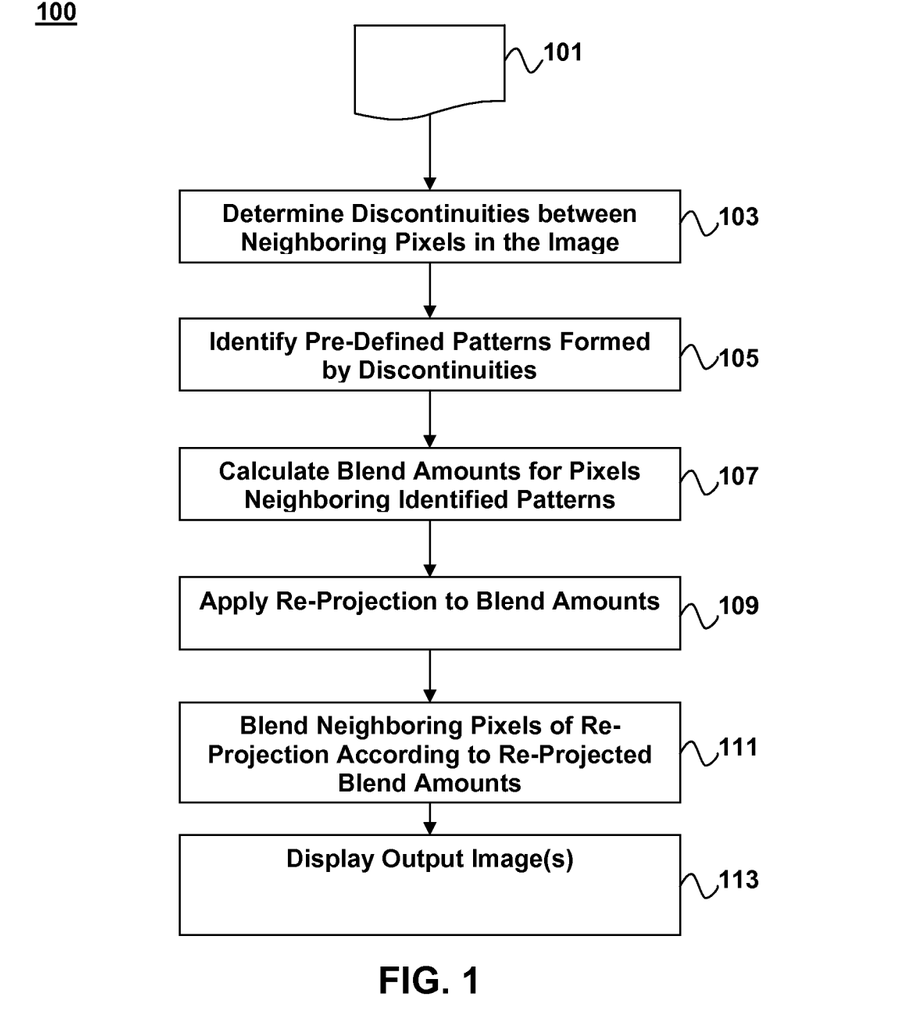
FIG. 1 is a flow diagram illustrating a method for morphological anti-aliasing (MLAA) of a three-dimensional re-projection of a two-dimensional image according to an embodiment of the present invention.

FIG. 1 is a flow diagram illustrating a method for morphological anti-aliasing (MLAA) of a re-projection of a two-dimensional image. The invented method 100 reduces costs associated with running MLAA more than once for a given image, while also reducing the rate of occurrence of haloing artifacts/aliasing associated with pre-re-projection MLAA. The method 100 splits the MLAA processing into two distinct stages, one that runs prior to re-projection, and one that runs after re-projection has occurred.

The method 100 may be applied to re-projection of two-dimensional left-eye and right-eye images for a three dimensional display. The left-eye and right-eye images may undergo MLAA and re-projection sequentially or simultaneously depending on the nature of the processing system used. The images 101 can be generated by a computer graphics program based on data for a virtual environment. The virtual environment, e.g., a video game environment, may be generated from data representing the physical characteristics (e.g., size, location, texture, lighting, etc.) for objects within the virtual environment. Views of the environment can be generated from a defined point of view, sometimes referred to as a virtual camera location. If the point of view is known, a field of view can be calculated. The field of view can be thought of as a three-dimensional shape, e.g., a cone, pyramid, or pyramidal frustum. Graphics software can determine whether virtual objects are inside the three-dimensional shape. If so, such objects are within the field of view and can be part of an image from the corresponding point of view. Virtual objects outside of the field of view can be excluded from image. It is noted that two separate points of view and corresponding fields of view that are slightly offset with respect to each other may be used to generate left-eye and right-eye images for 3D viewing of the virtual world.

Initially, a given two-dimensional image 101 undergoes a series of processing steps before it may be presented to a viewer as a smooth three-dimensional re-projection. The two-dimensional image 101 is first traversed to determine pixel discontinuities 103. A given image may be first traversed vertically and then horizontally, or vice versa. Pixel discontinuities occur between neighboring pixels (e.g., both vertical and horizontal neighbors) when those pixels have inconsistent characteristics. By way of example, and not by way of limitation, these characteristics may include color or geometric profiles associated with a given pixel. It is important to note that discontinuities may be defined to include any number of different characteristics between pixels.

Once pixel discontinuities for a given two-dimensional image have been determined, pre-defined patterns formed by these pixel discontinuities may be identified 105. By way of example, and not by way of limitation, a discontinuity between two pixels may be identified by a line separating the two pixels. Each pixel may be characterized by up to 4 different discontinuities (i.e., top, bottom, left, and right). Pixel discontinuities, both adjacent and orthogonal to each other, may form pre-defined patterns that characterize changes between pixels in the two-dimensional image. By way of example, and not by way of limitation, these pre-identified patterns may include an L-shape, U-shape, and Z-shape. An L-shaped pattern is formed when a chain of one or more pixel discontinuities intersects an orthogonal chain of one or more pixel discontinuities. A U-shaped pattern is formed when a chain of one or more pixel discontinuities intersects two orthogonal chains of one or more pixel discontinuities on opposite sides, each orthogonal chain being the same length and facing the same direction. A Z-shaped pattern is formed when a chain of one or more pixel discontinuities intersects two orthogonal chains of one or more pixel discontinuities on opposite sides, each orthogonal chain facing an opposite direction. These pre-defined patterns provide a blueprint for calculating pixel blend amounts.

After the pre-defined patterns formed by the pixel discontinuities have been identified for a given two-dimensional image, blending amounts can be calculated for pixels neighboring the identified patterns as indicated at 107. Depending on the arrangement of neighboring pixels surrounding a pre-defined pattern, a different blending amount may be selected for each individual pixel. The blend amount refers to a weighted color/geometric profile for a given pixel that is used to smooth transitions between discontinuous pixels. By way of example, and not by way of limitation, a pixel in closer proximity to a pre-defined pattern may experience a greater amount of blending than one further away. Various formulas based on identified pre-defined patterns may be used to determine a blending amount for each pixel in an image. This step concludes the first stage of morphological anti-aliasing of a three-dimensional projection of a two-dimensional image.

Following the determination of blend amounts, but prior to blending of pixels, re-projection is performed as indicated at 109. Re-projection involves mapping one or more two-dimensional images into a three-dimensional space. A different view of the same image is presented to each eye, creating the illusion of depth. Generally, each pixel of a two-dimensional image is assigned a color profile and a depth value during re-projection. These values are then manipulated for each view (i.e., left-eye view, right-eye view) to create a three-dimensional re-projection. In the invented method, additional information corresponding to the blend amounts is assigned to each pixel, and that information is converted into appropriate values for each view (i.e., a re-projection of the blend amount for each pixel). Thus, applying the re-projection to one or more two-dimensional images and to the blend amount for each pixel generates one or more re-projected images and re-projected blend amounts for each pixel in the images.

After re-projection of the images and the blend amounts, the re-projected blend amounts may be applied to the re-projection (e.g., each two-dimensional view of the three-dimensional re-projection) as indicated at 111 to produce output images. The neighboring pixels of the re-projected image(s) are blended according to the re-projected blend amounts thereby producing one or more output images. It is noted that where the one or more two dimensional images 101 include left eye and right eye views of a scene, the output images correspond to re-projected left-eye and right-eye images of the scene. The output images can be presented on a display, as indicated at 113. It is noted that in the case of three-dimensional stereoscopic left-eye and right-eye images, the images can be displayed sequentially or simultaneously depending on the nature of the display. For example, the left-eye and right-eye images may be displayed sequentially in the case of a 3D television display used with active shutter glasses. Alternatively, the left-eye and right-eye images may be displayed simultaneously in the case of a dual-projection type display used with passive 3D viewing glasses having differently colored or differently polarized left-eye and right-eye lenses.

Although blend amounts were determined prior to re-projection, image edges are not expected to significantly change during re-projection from two dimensions to three dimensions. As such, a smooth image can be produced without suffering from any of the consequences associated with the two possible solutions described above.

Figure 2:
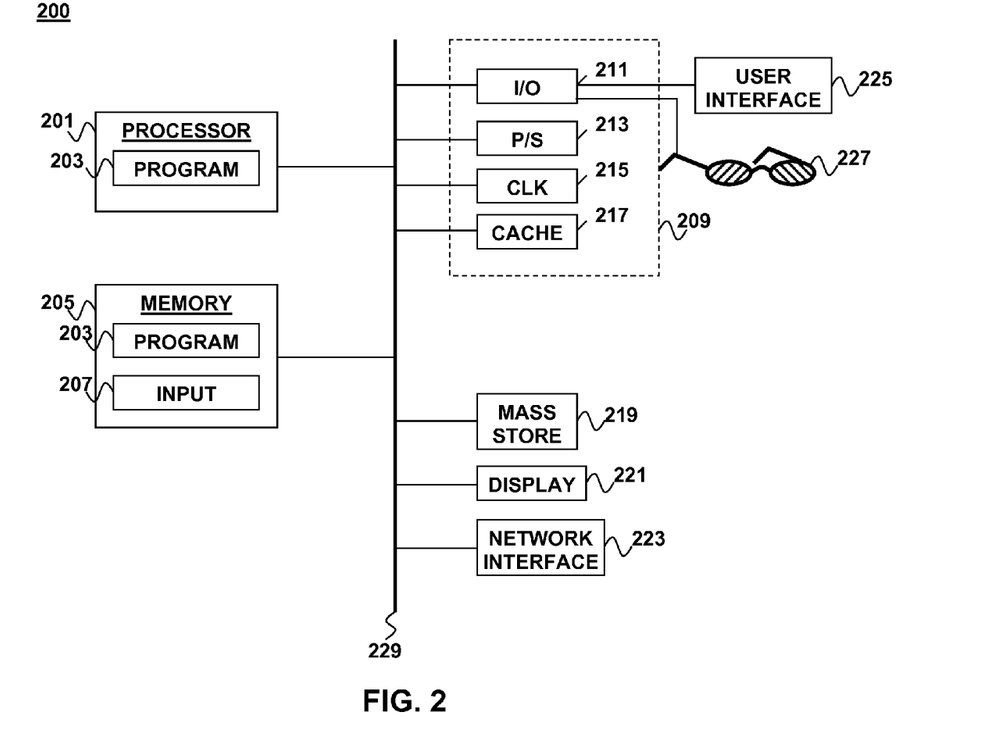
FIG. 2 is a block diagram illustrating an apparatus for morphological anti-aliasing of a three-dimensional re-projection of a two-dimensional image according to an embodiment of the present invention.

FIG. 2 illustrates a block diagram of a computer apparatus that may be used to implement a method for morphological anti-aliasing (MLAA) of a three-dimensional re-projection of a two-dimensional image. The apparatus 200 generally may include a processor module 201 and a memory 205. The processor module 201 may include one or more processor cores. An example of a processing system that uses multiple processor modules, is a Cell Processor, examples of which are described in detail, e.g., in *Cell Broadband Engine Architecture*, Version 1.0, Aug. 8, 2005, which is incorporated herein by reference.

The memory 205 may be in the form of an integrated circuit, e.g., RAM, DRAM, ROM, and the like. The memory 205 may also be a main memory that is accessible by all of the processor modules. In some embodiments, the processor module 201 may have local memories associated with each core. A program 203 may be stored in the main memory 205 in the form of processor readable instructions that can be executed on the processor modules. The program 203 may be configured to perform morphological anti-aliasing (MLAA) of a three-dimensional projection of a two-dimensional image. The program 203 may be written in any suitable processor readable language, e.g., C, C++, JAVA, Assembly, MATLAB, FORTRAN, and a number of other languages. Input data 207 may also be stored in the memory. Such input data 207 may include information regarding neighboring pixel discontinuities, identification of pre-defined patterns, and pixel blend amounts. During execution of the program 203, portions of program code and/or data may be loaded into the memory or the local stores of processor cores for parallel processing by multiple processor cores.

The apparatus 200 may also include well-known support functions 209, such as input/output (I/O) elements 211, power supplies (P/S) 213, a clock (CLK) 215, and a cache 217. The apparatus 200 may optionally include a mass storage device 219 such as a disk drive, CD-ROM drive, tape drive, or the like to store programs and/or data. The device 200 may optionally include a display unit 221 and user interface unit 225 to facilitate interaction between the apparatus and a user. By way of example, and not by way of limitation, the display unit 221 may be in the form of a 3-D ready television set that displays text, numerals, graphical symbols, or other visual objects as stereoscopic images to be perceived with a pair of 3-D viewing glasses 227, which can be shutter glasses that are coupled to the I/O elements 211. Alternatively, the display unit 221 may include a 3-D projector that simultaneously projects left-eye and right-eye images on a screen. In such a case, the 3-D viewing glasses can be passive glasses with differently colored or differently polarized left-eye and right-eye lenses. Stereoscopy refers to the enhancement of the illusion of depth in a two-dimensional image by presenting a slightly different image to each eye. The user interface 225 may include a keyboard, mouse, joystick, light pen, or other device that may be used in conjunction with a graphical user interface (GUI). The apparatus 200 may also include a network interface 223 to enable the device to communicate with other devices over a network such as the internet.

The components of the system 200, including the processor 201, memory 205, support functions 209, mass storage device 219, user interface 225, network interface 223, and display 221 may be operably connected to each other via one or more data buses 229. These components may be implemented in hardware, software, or firmware, or some combination of two or more of these.

There are a number of additional ways to streamline parallel processing with multiple processors in the apparatus. For example, it is possible to "unroll" processing loops, e.g., by replicating code on two or more processor cores and having each processor core implement the code to process a different piece of data. Such an implementation may avoid latency associated with setting up the loop. As applied to our invention, multiple processors could determine discontinuities between pixels for a given image in parallel (e.g., one processor performing a horizontal pass and another processor performing a vertical pass). The ability to process data in parallel saves valuable processing time, leading to a more efficient and streamlined system for morphological anti-aliasing of a three-dimensional re-projection of a two-dimensional image.

Figure 3:
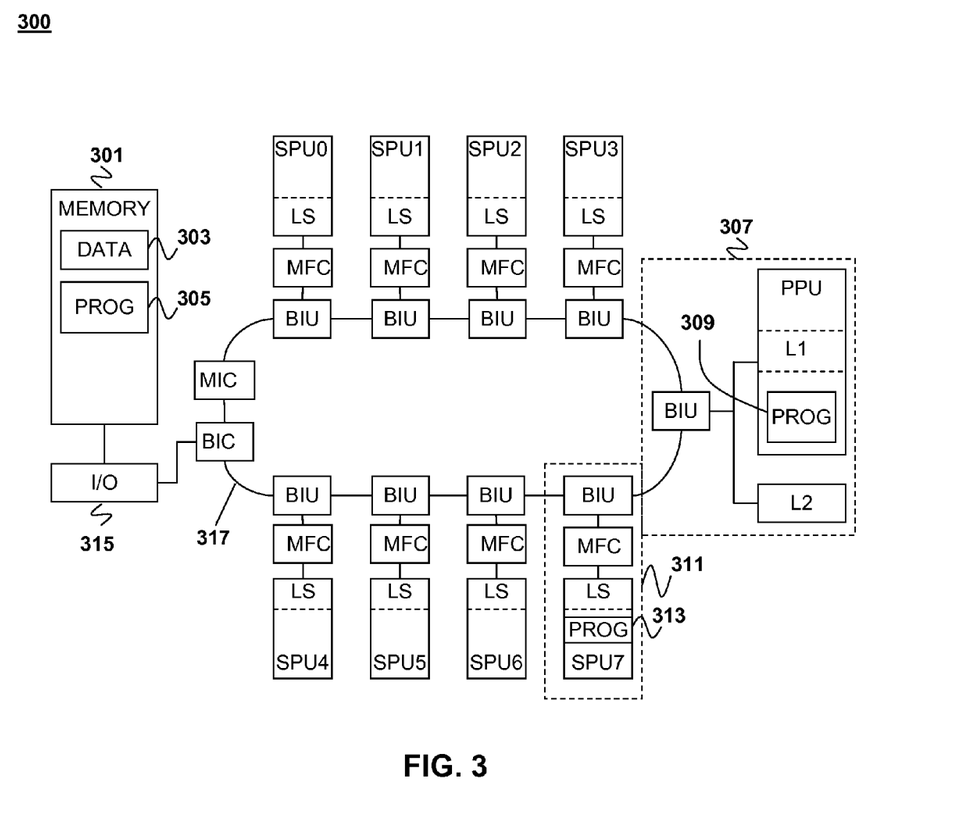
FIG. 3 is a block diagram illustrating an example of a cell processor implementation of an apparatus for morphological anti-aliasing of a three-dimensional re-projection of a two-dimensional image according to an embodiment of the present invention.

One example, among others of a processing system capable of implementing parallel processing on three or more processors is a cell processor. There are a number of different processor architectures that may be categorized as cell processors. By way of example, and without limitation, FIG. 3 illustrates a type of cell processor. The cell processor 300 includes a main memory 301, a single power processor element (PPE) 307, and eight synergistic processor elements (SPE) 311. Alternatively, the cell processor may be configured with any number of SPEs. With respect to FIG. 3, the memory 301, PPE 307 and SPEs 311 can communicate with each other and with an I/O device 315 over a ring-type element interconnect bus 317. The memory 301 contains input data 303 having features in common with the program described above. At least one of the SPEs 311 may include in its local store (LS) morphological anti-aliasing of a three-dimensional re-projection of a two-dimensional image instructions 313 and/or a potion of the input data that is to be processed in parallel, e.g., as described above. The PPE 307 may include in its L1 cache, morphological anti-aliasing of three-dimensional re-projection of two-dimensional image instructions 309 having features in common with the program described above. Instructions 305 and data 303 may also be stored in memory 301 for access by the SPE 311 and PPE 307 when needed. It should be noted that any number of processes involved in the invented method of morphological anti-aliasing of a three-dimensional re-projection of a two-dimensional image may be parallelized using the cell processor. MLAA has tremendous parallelization potential and on a multi-core machine can be used to achieve better load balancing by processing the final output image in idle threads (either ones that finish rendering or ones that finish building their part of an acceleration structure).

By way of example, the PPE 307 may be a 64-bit PowerPC Processor Unit (PPU) with associated caches. The PPE 307 may include an optional vector multimedia extension unit. Each SPE 311 includes a synergistic processor unit (SPU) and a local store (LS). In some implementations, the local store may have a capacity of e.g., about 256 kilobytes of memory for programs and data. The SPUs are less complex computational units than the PPU, in that they typically do not perform system management functions. The SPUs may have a single instruction, multiple data (SIMD) capability and typically process data and initiate any required data transfers (subject to access properties set up by a PPE) in order to perform their allocated tasks. The SPUs allow the system to implement applications that require a higher computational unit density and can effectively use the provided instruction set. A significant number of SPUs in a system, managed by the PPE allows for cost-effective processing over a wide range of applications. By way of example, the cell processor may be characterized by an architecture known as Cell Broadband Engine Architecture (CBEA). In CBEA-compliant architecture, multiple PPEs may be combined into a PPE group and multiple SPEs may be combined into an SPE group. For purposes of example, the cell processor is depicted as having a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in *Cell Broadband Engine Architecture*, which is incorporated herein by reference.

Figure 4:
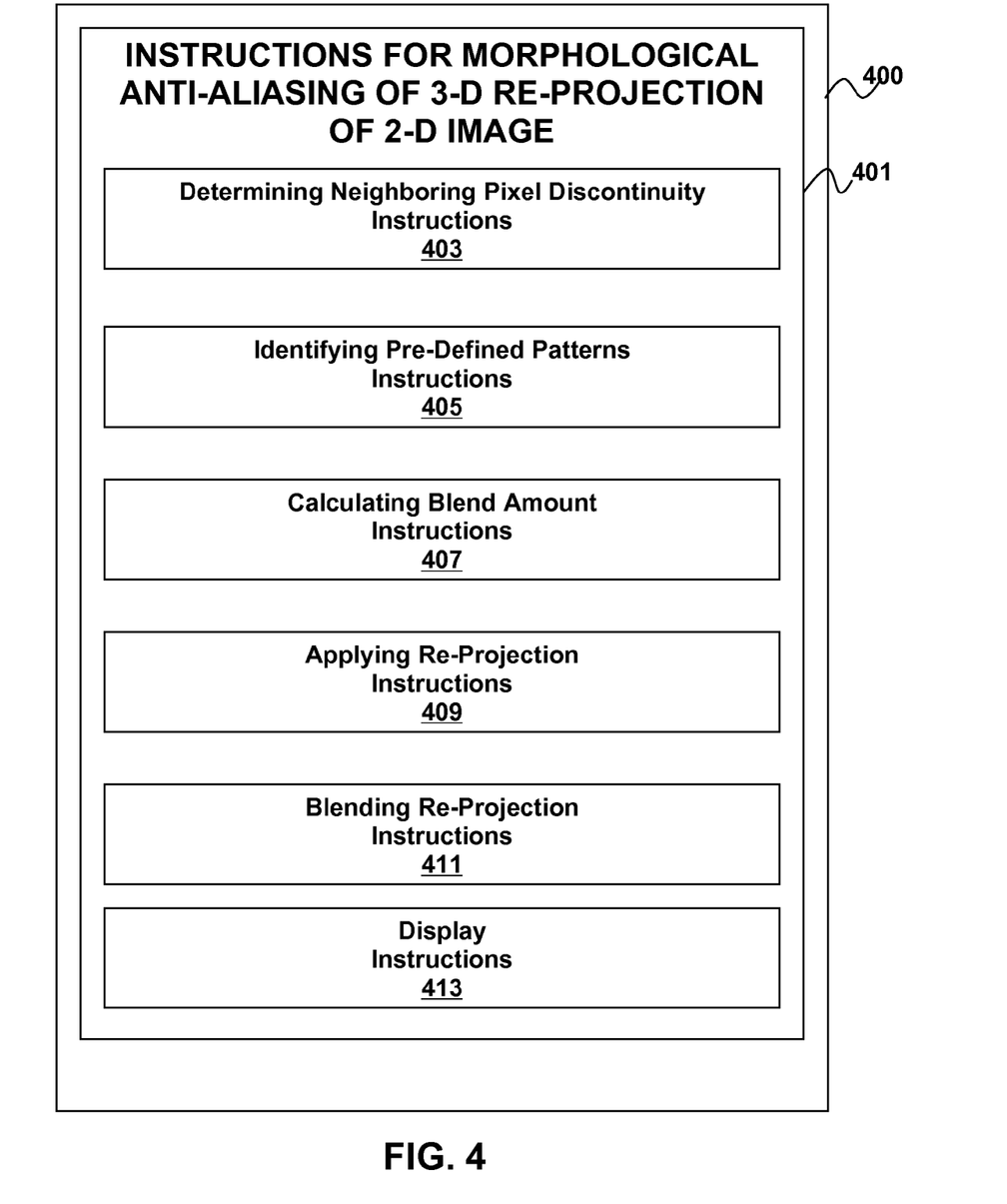
FIG. 4 illustrates an example of a non-transitory computer-readable storage medium with instructions for implementing morphological anti-aliasing of a three-dimensional re-projection of a two-dimensional image according to an embodiment of the present invention.

According to another embodiment, instructions for morphological anti-aliasing of a three-dimensional re-projection of a two-dimensional image may be stored in a computer readable storage medium. By way of example, and not by way of limitation, FIG. 4 illustrates an example of a non-transitory computer readable storage medium 400 in accordance with an embodiment of the present invention. The storage medium 400 contains computer-readable instructions stored in a format that can be retrieved, interpreted, and executed by a computer processing device. By way of example, and not by way of limitation, the computer-readable storage medium may be a computer-readable memory, such as random access memory (RAM) or read-only memory (ROM), a computer-readable storage disk for a fixed disk drive (e.g., a hard disk drive), or a removable disk drive. In addition, the computer-readable storage medium 400 may be a flash memory device, a computer-readable tape, a CD-ROM, a DVD-ROM, a Blu-Ray, HD-DVD, UMD, or other optical storage medium.

The storage medium 400 contains instructions for morphological anti-aliasing of a three-dimensional re-projection of a two-dimensional image 401. The instructions for morphological anti-aliasing of a three-dimensional re-projection of a two-dimensional image 401 may be configured to implement morphological anti-aliasing in accordance with the methods described above with respect to FIG. 1. In particular, the morphological anti-aliasing instructions 401 may include determining neighboring pixel discontinuity instructions 403 that are used to determine discontinuities between neighboring pixels in a given image. The determination of discontinuities may be completed in two stages. The vertical discontinuities between neighboring vertical pixels may be determined in one stage and the horizontal discontinuities between neighboring horizontal pixels may be determined in another. Alternatively, the vertical and horizontal discontinuities may be determined at the same time. A discontinuity may occur when there is a difference in color profiles between two neighboring pixels, a difference in geometric profiles between two neighboring pixels, or any number of other differences between neighboring pixels in the given image.

The morphological anti-aliasing instructions 401 may also include identifying pre-defined pattern instructions 405 that identify one or more pre-defined patterns formed by the discontinuities between pixels. These pre-defined patterns may include a U-shaped pattern, a Z-shaped pattern, and an L-shaped pattern as discussed above.

The morphological anti-aliasing instructions 401 may further include calculating blend amount instructions 407 that are configured to calculate blend amounts for pixels neighboring the pre-defined patterns formed by the discontinuities. The blend amount refers to a weighted color/geometric profile for a given pixel that is used to smooth transitions between discontinuous pixels. For example, a black pixel neighboring a white pixel may produce a blend amount that transforms the black pixel (and perhaps other neighboring pixels) into a grey pixel such that the sensation of jagged edges caused by the discontinuity is subdued when perceived by a viewer.

The morphological anti-aliasing instructions 401 may include applying three-dimensional re-projection instructions 409 that apply re-projection to both the two-dimensional image and its corresponding blend amounts. Rather than applying the blend amounts to the two-dimensional image prior to re-projection, these instructions three-dimensionally re-project the blend amounts (i.e., transform the blend amounts into their corresponding three-dimensional re-projection values) such that blending may occur at a later step.

The morphological anti-aliasing instructions 401 may additionally include blending three-dimensional re-projection instructions 411 that blend the three-dimensional re-projection of the two dimensional image according to the re-projected blend values thereby producing one or more output images.

The morphological anti-aliasing instructions 401 may additionally include display instructions 413 that format the output images for presentation on a display.

Embodiments of the present invention allow implementation of MLAA in a manner which can produce a better MLAA result than conventional approaches while reducing the amount of work that needs to be done by the processors implementing the MLAA.

Although examples of implementations have been described in which stereoscopic 3D images are viewed using passive or active 3D viewing glasses, embodiments of the invention are not limited to such implementations. Specifically, embodiments of the invention can be applied to stereoscopic 3D video technologies that do not rely on head tracking or passive or active 3D-viewing glasses. Examples of such "glasses-free" stereoscopic 3D video technologies are sometimes referred to as Autostereoscopic technologies or Autostereoscopy. Examples of such technologies include, but are not limited to, technologies based on the use of lenticular lenses. A lenticular lens is an array of magnifying lenses, designed so that when viewed from slightly different angles, different images are magnified. The different images can be chosen to provide a three-dimensional viewing effect as a lenticular screen is viewed at different angles. The number of images generated increases proportionally to the number of viewpoints for the screen—the more images used in such a system the more useful embodiments of this invention become to implementing morphological anti-aliasing in such systems.

More specifically in a lenticular lens video system, re-projection images of a scene from slightly different viewing angles can be generated from an original 2D image and depth information for each pixel in the image. Using re-projection techniques, different views of the scene from progressively different viewing angles can be generated from the original 2D image and depth information. Images representing the different views can be divided into strips and displayed in an interlaced fashion on an autostereoscopic display having a display screen that lies between a lenticular lens array and viewing location. The lenses that make up the lenticular lens can be cylindrical magnifying lenses that are aligned with the strips and generally twice as wide as the strips. A viewer perceives different views of the scene depending on the angle at which the screen is viewed. The different views can be selected to provide the illusion of depth in the scene being displayed.

Furthermore although certain embodiments of the present invention can solve aliasing issues in the case of three-dimensional re-projection of two-dimensional images and involve generating more than one image for the re-projection, embodiments are more generally applicable to non-3D cases of re-projection. In addition, in some three-dimensional implementations it might not be necessary to generate two or more images. For example, in the case of a stereoscopic display it might not be necessary to generate both left-eye and right-eye images via re-projection. Alternatively, one could generate only one new image via re-projection. For instance it is possible to start with color and depth information for each pixel for a left-eye image and generate the corresponding right-eye image via re-projection (or vice versa) resulting in enough images to display with a stereoscopic display. This would involve generating only a single re-projected image.

Although the present invention has been described in considerable detail with reference to certain preferred versions thereof, other versions are possible. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of any papers and documents incorporated herein by reference.

What is claimed is:

1. A method for morphological anti-aliasing (MLAA) of a re-projection of one or more two-dimensional images, comprising:

a) determining, with a computer, one or more discontinuities between each neighboring pixel of the one or more two-dimensional images;
b) identifying one or more pre-defined patterns formed by the one or more discontinuities in a);
c) calculating a blend amount for each pixel neighboring the pre-defined patterns identified in b);
d) applying a re-projection to the one or more two-dimensional images and to the blend amount for each pixel thereby generating one or more re-projected images and re-projected blend amounts;
e) blending neighboring pixels of the one or more re-projected images according to the re-projected blend amounts thereby producing one or more output images; and
f) displaying the one or more output images.

2. The method of claim 1 wherein the one or more output images include left eye and right eye views of a scene, whereby the output images correspond to re-projected left-eye and right-eye images of the scene.

3. The method of claim 1 wherein f) includes displaying the re-projected left-eye and right-eye images on a three-dimensional display.

4. The method of claim 1, wherein a discontinuity occurs between neighboring pixels when each pixel has a different color profile.

5. The method of claim 1, wherein a discontinuity occurs between neighboring pixels when each pixel has a different geometric profile.

6. The method of claim 1, wherein a) includes discovering horizontal discontinuities between neighboring horizontal pixels or discovering vertical discontinuities between neighboring vertical pixels.

7. The method of claim 1, wherein a) includes discovering vertical discontinuities between neighboring vertical pixels and discovering horizontal discontinuities between neighboring horizontal pixels.

8. The method of claim 1, wherein f) includes dividing the one or more two-dimensional images into strips, interlacing the strips with strips of one or more different two-dimensional images of different views of a scene, thereby producing a set of interlaced images, and displaying interlaced images on an autostereoscopic display having lenticular lens that lies between a display screen and a viewing location.

9. The method of claim 1, wherein the pre-defined patterns in b) include an L-shaped pattern.

10. The method of claim 1, wherein the pre-defined patterns in b) include a U-shaped pattern.

11. The method of claim 1, wherein the pre-defined patterns in b) include a Z-shaped pattern.

12. An apparatus for morphological anti-aliasing, comprising:
a processor;
a memory; and
computer coded instructions embodied in the memory and executable by the processor, wherein the computer coded instructions are configured to implement a method for morphological anti-aliasing of a re-projection of one or more two-dimensional images, the method comprising:
a) determining one or more discontinuities between each neighboring pixel of the one or more two-dimensional images;
b) identifying one or more pre-defined patterns formed by the one or more discontinuities;
c) calculating a blend amount for each pixel neighboring the pre-defined patterns identified in b);
d) applying a re-projection to the one or more two-dimensional images and to the blend amount for each pixel thereby generating one or more re-projected images and re-projected blend amounts; and
e) blending neighboring pixels of the one or more re-projected images according to the re-projected blend amounts thereby producing one or more output images.

13. The apparatus of claim 12, further comprising a three-dimensional visual display configured to display the one or more output images.

14. The apparatus of claim 13, wherein the one or more two dimensional images include left eye and right eye views of a scene, whereby the output images correspond to re-projected left-eye and right-eye images of the scene.

15. The apparatus of claim 13, wherein the display is an autosteropscopic display having lenticular lens that lies between a display screen and a viewing location.

16. The apparatus of claim 15, wherein the one or more two-dimensional images are divided into strips, interlacing the strips with strips of one or more different two-dimensional images of different views of a scene, thereby producing a set of interlaced images.

17. The apparatus of claim 12, wherein a discontinuity occurs between neighboring pixels when each pixel has a different color profile.

18. The apparatus of claim 12, wherein a discontinuity occurs between neighboring pixels when each pixel has a different geometric profile.

19. The apparatus of claim 12, wherein a) includes first discovering horizontal discontinuities between neighboring horizontal pixels followed by discovering vertical discontinuities between neighboring vertical pixels.

20. The apparatus of claim 12, wherein a) includes first discovering vertical discontinuities between neighboring vertical pixels followed by discovering horizontal discontinuities between neighboring horizontal pixels.

21. The apparatus of claim 12, wherein the pre-defined patterns in b) include an L-shaped pattern.

22. The apparatus of claim 12, wherein the pre-defined patterns in b) include a U-shaped pattern.

23. The apparatus of claim 12, wherein the pre-defined patterns in b) include a Z-shaped pattern.

24. A non-transitory, computer-readable storage medium having computer readable program code embodied in said medium for morphological anti-aliasing (MLAA) of a re-projection of a two-dimensional image, said medium comprising:
a) computer readable program code means for determining one or more discontinuities between each neighboring pixel of the two-dimensional image;
b) computer readable program code means for identifying one or more pre-defined patterns formed by the one or more discontinuities;
c) computer readable program code means for calculating a blend amount for each pixel neighboring the pre-defined patterns identified in b);
d) computer readable program code means for applying a re-projection to the two-dimensional image and to the blend amount for each pixel thereby generating a re-projected image and re-projected blend amounts; and
e) computer readable program code means for blending neighboring pixels of the re-projected image according to the re-projected blend amounts thereby producing one or more output images; and f) computer readable program code means for displaying the one or more output images.

\* \* \* \* \*